United States Patent [19]

Joseph

[11] 4,382,216
[45] May 3, 1983

[54] SYSTEM FOR CONTROLLING THE MOVEMENT OF A ROTATABLE MEMBER

[75] Inventor: Craig L. Joseph, San Jose, Calif.

[73] Assignee: FMC Corporation, Chicago, Ill.

[21] Appl. No.: 326,104

[22] Filed: Nov. 30, 1981

Related U.S. Application Data

[63] Continuation of Ser. No. 4,530, Jan. 18, 1979.

[51] Int. Cl.³ ............................................. G05B 11/01
[52] U.S. Cl. ................................. 318/630; 89/42 R; 318/648; 318/649
[58] Field of Search ............... 318/617, 618, 611, 630, 318/294, 327, 341, 648, 649; 89/41 M, 41 LE, 41 ME, 42 R; 74/5.4

[56] References Cited

U.S. PATENT DOCUMENTS

| | | | |
|---|---|---|---|
| 2,628,535 | 2/1953 | Terwilliger et al. | |
| 2,777,285 | 1/1957 | McDonald | 89/41 LE |
| 2,921,249 | 1/1960 | Oppen | 318/448 |
| 3,041,518 | 6/1962 | Blomquist et al. | 318/448 |
| 3,293,522 | 12/1966 | Lewis | 318/327 |
| 3,413,534 | 11/1968 | Stringer | 318/308 |
| 3,456,177 | 7/1969 | Wilkerson | 318/302 |
| 3,456,511 | 7/1969 | Clark et al. | 74/5.4 |
| 3,530,353 | 9/1970 | Thompson | 318/341 |
| 3,573,591 | 4/1971 | Turtle | 318/681 |
| 3,599,063 | 8/1971 | Nanai | 318/327 |
| 3,694,720 | 9/1972 | Nakajima | 318/327 |
| 3,989,992 | 11/1976 | Schmidt | 318/341 |
| 4,109,190 | 8/1978 | McNaughton | 318/609 |

*Primary Examiner*—David Smith, Jr.
*Attorney, Agent, or Firm*—H. M. Stanley; R. B. Megley

[57] ABSTRACT

A rotatable member, such as a turret at a weapons station, is controllable about an azimuth axis. A weapon is carried in the turret with the weapon being controllable therewithin about an elevation axis. The moments of inertia of the turret and weapon about the azimuth axis and of the weapon about the elevation axis are relatively high. The disclosed system provides for elevation and azimuth control through elevation and azimuth drive trains having reflected drive train inertias which are at least two orders of magnitude smaller than the inertia of the turret and weapon about the azimuth axis and at least one order of magnitude smaller than the inertia of the weapon about the elevation axis. Further, the system senses spurious torque applied about either axis, as for example due to the recoil of the fixed weapon, and provides automatic repositioning of the controlled members about either axis to compensate for angular displacement caused by the spurious torque.

4 Claims, 4 Drawing Figures

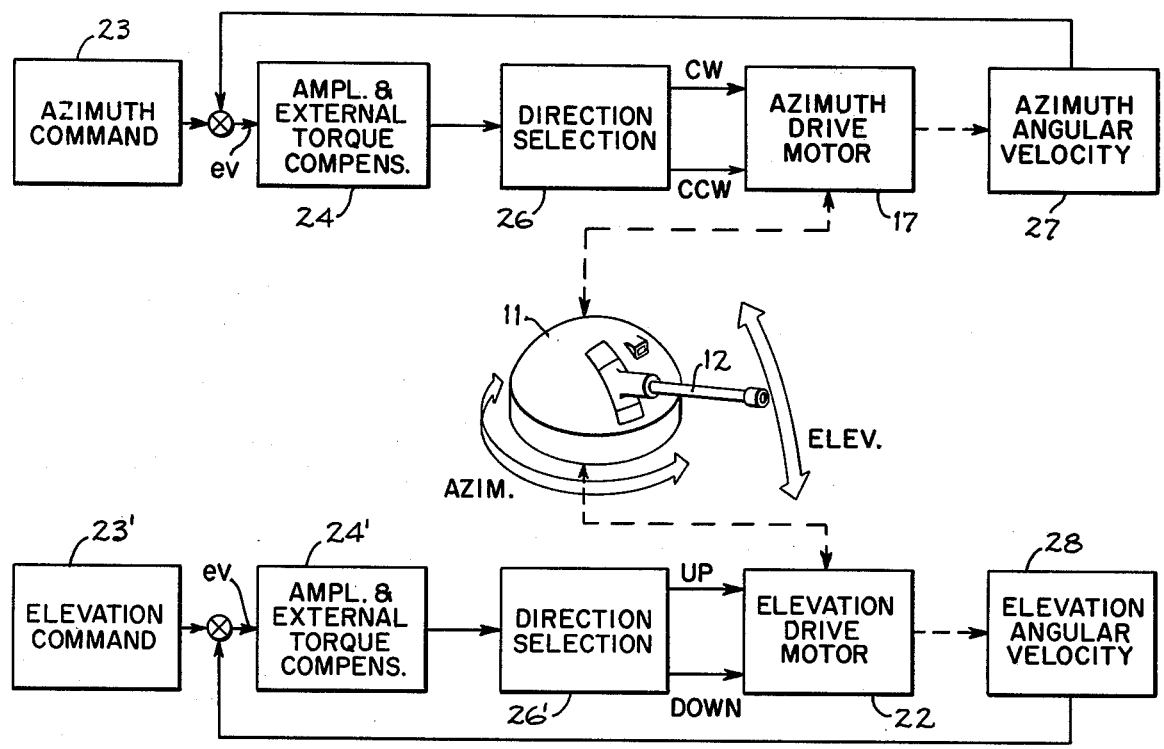
FIG_1
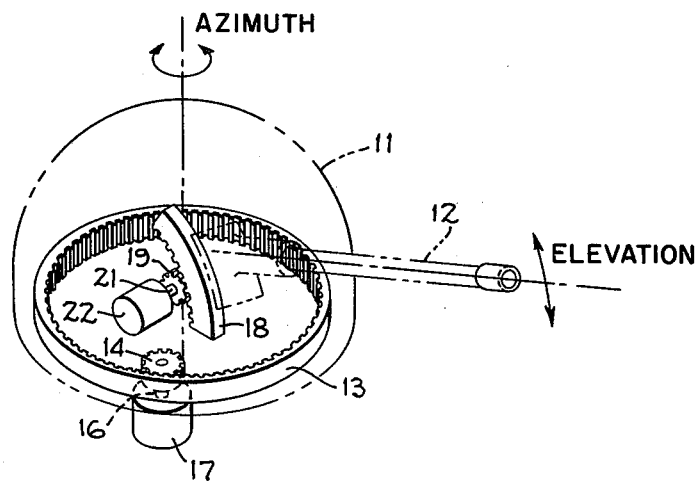
FIG_2

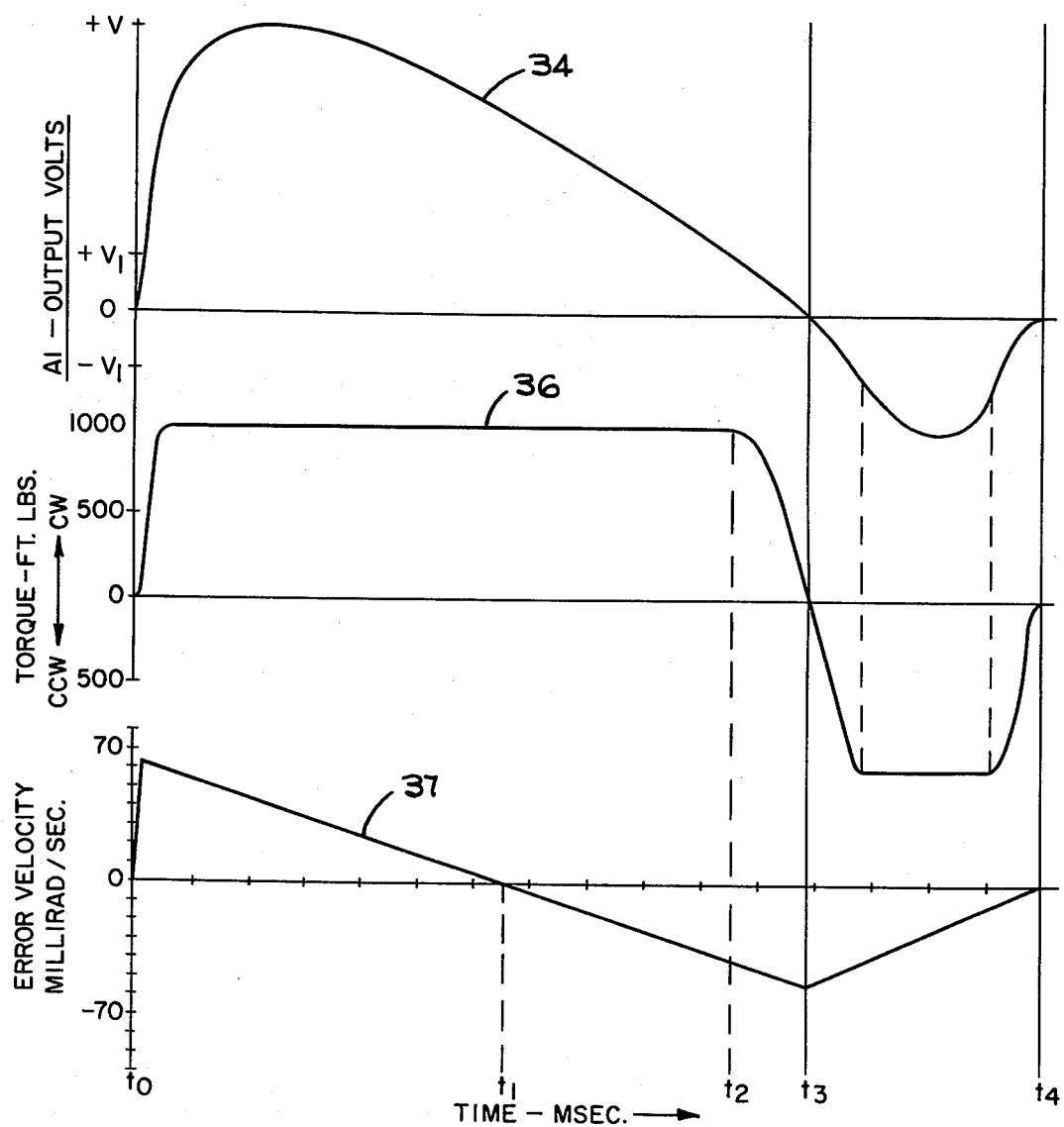
FIG_4

SYSTEM FOR CONTROLLING THE MOVEMENT OF A ROTATABLE MEMBER

This application is a continuation of application Ser. No. 004,530, filed Jan. 18, 1979.

BACKGROUND OF THE INVENTION

1. Field of the Invention

The disclosed apparatus relates to a system for controlling the position of a moveable gun about an axis of rotation, and more particularly to such a system using velocity feedback.

2. Description of the Prior Art

Armed mobile vehicles often have turrets mounted therein which are movable in azimuth and which carry weapons which are movable within the turrets in elevation. In the instance where the weapon is mounted off of the center of rotation in azimuth, the weapon recoil when the weapon is fired will impose a torque about the azimuth rotation axis. Additional torques about the azimuth axis will be imparted to the turret when the counter recoil forces are applied thereto as the breech bolt slams forward into the back of the chamber structure preparatory to firing the ensuing round. Spurious torques may also be experienced about the elevation axis for the weapon as the vehicle rocks on its suspension due to weapon recoil. When an ammunition feed belt is attached to the weapon breech, additional spurious torques about the elevation axis will be imposed due to the feed belt reaction forces.

By way of example, a typical offset, single 20 millimeter turret-mounted weapon carried in an armored vehicle wherein the weapon is capable of being directed in azimuth and elevation will impart 6,000 ft.-lbs. of torque at the turret azimuth ring drive gear for each round fired. This torque level may be substantially overcome in a weapons control system by providing a high reflected drive train inertia to the turret. However, such an approach results in well-known system backlash errors and response time disadvantages. Further, at firing rates of 200 rounds per minute or greater, accumulated error due to the successive recoil torques is unacceptable.

Velocity feedback in control systems is well known. Such a system is seen in U.S. Pat. No. 3,041,518, issued to Blomqvist et al, which relates to a system for controlling the position of a gun barrel to obtain appropriate lead on a target being tracked. In one embodiment described by Blomqvist et al a filter network is provided in the forward control loop which appears to impose a time displacement in the fire control signal provided at the system input in order to provide said firing lead. Blomqvist et al further describe a servo motor for driving the gun mount which is energized by the system output signal and which has an output shaft on which is mounted a gear which meshes with an arc gear attached to the breech ring of the gun barrel. Blomqvist et al do not deal with the critical problem area, relating to relative drive train and driven member inertias together with drive gear ratios, which is so vital in obtaining an acceptable system response.

U.S. Pat. No. 3,456,177 issued to Wilkerson discloses a motor control system which includes tachometer or velocity feedback and also includes an amplifier in the forward portion of the servo loop. The amplifier may include a feedback capacitor which operates to integrate noise signals included in the error signal to thereby reduce instantaneous noise signal values to a level which will not interfere with the control accuracy of the system. A similar system is seen in the U.S. Pat. No. 3,413,534 issued to Stringer.

SUMMARY OF THE INVENTION

The disclosed system operates to control the position of a gun turret which is movable about an azimuth axis, wherein a rapid fire gun having a rapid fire period is mounted in the turret and is displaced laterally from the azimuth axis. An azimuth drive motor is provided which drives a single azimuth drive gear. A ring gear is meshed with the single azimuth drive gear and is disposed so that when the drive motor is energized the turret is rotated about the azimuth axis. The reflected moment of inertia of the drive motor and the single azimuth drive gear is at least two orders of magnitude less than the moment of inertia of the turret about the azimuth axis. An angular velocity sensor is mounted to provide a signal which is indicative of the rate of turn of the turret about the azimuth axis. A command control is accessible to an operator and provides an azimuth input velocity command signal to the system. Means is included for comparing and for integrating the difference between the input command signal and the rate of turn signal and for providing an error signal which is responsive to the integration. Means is also provided for coupling the error signal to the azimuth drive motor so that the angular position error due to disturbance torque input about the azimuth axis caused by recoil during firing of the laterally displaced gun in the turret is corrected well within the rapid fire period.

BRIEF DESCRIPTION OF THE DRAWINGS

FIG. 1 is a block diagram of the control system of the present invention for controlling gun turret movement about both azimuth and elevation axes.

FIG. 2 is a partial isometric view of a gun turret showing the drive train and driven members controlled by the control system of the present invention.

FIG. 4 is a timing diagram showing system transient conditions induced by application of external torque to the driven members of the gun turret.

DESCRIPTION OF THE PREFERRED EMBODIMENT

Figure 3:
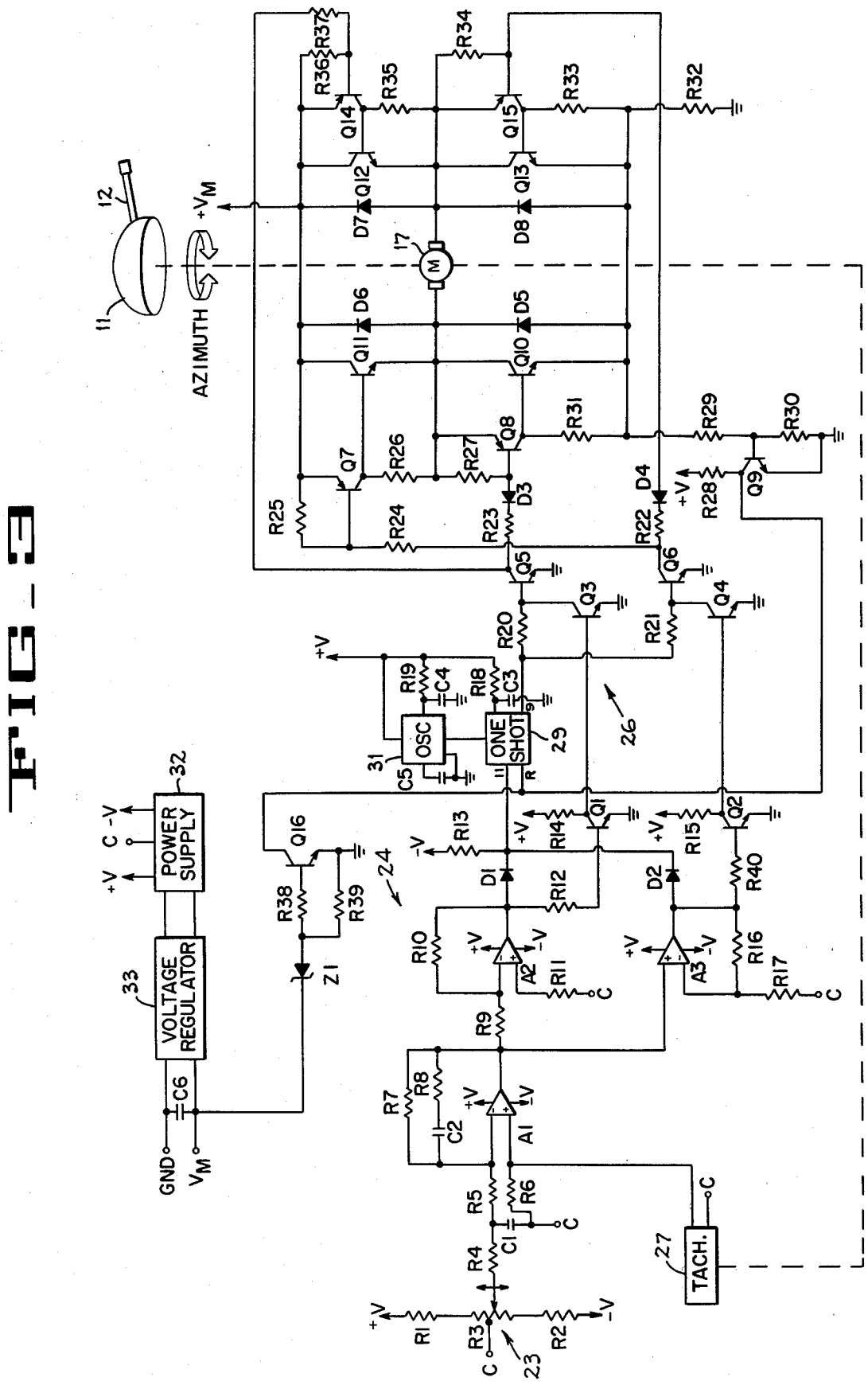
FIG. 3 is an electrical schematic diagram of the control circuitry for one control channel of the control system.

In controlling a rotatable member about an axis of rotation a feedback signal is used which is related to the angular velocity of the rotatable member about the rotation axis. If external torques are applied to the rotatable member so that the member is moved away from an initial position about the rotation axis the velocity feedback will arrest the motion due to the spurious torques, but will not serve to return the rotatable member to the initial angular position. In the system of the present invention the rotatable member is returned to the original angular position by means of an automatically generated return motor drive signal which is coupled to the drive system.

The system disclosed herein accomplishes automatic correction for angular position error imposed on a gun turret by spurious external torques applied about the rotation axis of the turret by weapon recoil while simultaneously presenting a low reflected drive train inertia to the rotatable member with the consequent system response advantages. As seen in FIG. 1 of the drawings a turret 11 is movable rotationally in azimuth about an azimuth axis and carries a weapon 12 which is in turn movable rotationally in elevation about an elevation axis. The turret 11 is movable in azimuth through the interaction of an azimuth ring gear 13, seen in FIG. 2, and a single azimuth drive gear 14 mounted on a shaft 16 extending from a servo motor 17. An arc gear 18 is attached to structure which is attached to the breech of the weapon 12, moving therewith. The arc gear 18 meshes with a single elevation drive gear 19 for driving the weapon in elevation. The elevation drive gear is mounted to the end of a shaft 21 which is driven rotationally by a second servo motor 22.

The servo motors 17 and 22 may be seen (FIG. 2) to drive the turret 11 about the azimuth axis and the weapon 12 about the elevation axis respectively. The drive about both the azimuth and elevation axes is direct, being accomplished through the single gear members 14 and 19. The gear ratios in the embodiment described herein have been selected as 25:1 for the elevation drive and 45:1 for the azimuth drive. High torsional stiffness is provided by the one inch diameter motor shafts 16 and 21 which transfer the servo motor torques to the respective drive gears mounted thereon. With only one gear mesh required for each axis of drive and high shaft torsional stiffness, extremely low mechanical backlash and drive train inertias result as will hereinafter be shown. An appropriate servo motor for use in this application is Model TT2953 manufactured by Inland Motor Division, Kollmorgen Corporation, Radford, Va. Such motors are combination servo motors and tachometers which respond to a power signal to provide shaft output torque and simultaneously provide an output signal indicative of the rotational speed of the motor.

Referring now to FIG. 1, the system is shown in block form wherein the elevation and azimuth command channels are seen to be similar. Therefore primed numbers are applied to like circuit portions in the elevation channel. An azimuth command device 23 is provided which is controlled by an operator and which provides an input command signal to an amplification and external torque compensation network 24. A direction selection circuit portion 26 is coupled to the output of the amplification and torque compensation network providing appropriate clockwise or counterclockwise output signals (up or down for elevation) to the azimuth drive motor 17 (elevation drive motor 22 for elevation). An azimuth angular velocity sensor 27 is coupled to the azimuth drive motor (elevation angular velocity sensor 28 being coupled to the elevation drive motor), which sensor provides an angular velocity indicative output signal which is fed back to the input of the amplifier and external torque compensation circuit 24 where an error signal, ev, is generated by comparing the input command signal and the feedback signal. As mentioned hereinbefore, the azimuth and elevation servo motors 17 and 22 have tachometers included in the motor housings which serve as the azimuth and elevation angular velocity sensors 27 and 28 respectively.

The efficiency of operation of the system containing the aforementioned servo motors 17 and 22 is measured by the ratio of the horsepower at the servo motor shafts 16, 21 to the electrical power input to the system. Due to the direct drive feature described hereinbefore an efficiency of 90% is observed in the disclosed system as compared with the presently available systems that use electrical drive motors which exhibit approximately 40% efficiency. Readily available hydraulic actuated control systems of this type commonly operate at 25% efficiency. Moreover, the direct drive feature disclosed herein provides for an extremely low commanded threshold velocity. The absence of backlash and the low reflected drive train inertias allow a command threshold of approximately 0.05 millirad/sec.

In FIG. 3, the control circuit for the azimuth control channel is shown. The circuitry for the elevation control channel is substantially identical to that shown in FIG. 3 and therefore only the azimuth control circuitry will be described in detail herein. The azimuth command device 23 is seen as including a variable resistor or potentiometer R3 having a positive DC voltage $+V$ coupled to one end thereof and a negative DC voltage $-V$ coupled to the other end thereof with a common connected center tap indicated at C. A movable contact is provided on variable resistor R3 which is positioned as desired by the operator to provide the appropriate input command signal to drive the gun turret 11 either clockwise ($+V$) or counterclockwise ($-V$).

The input command signal from R3 is coupled through resistors R4 and R5 to the inverting input on a differential amplifier A1 which forms the summing junction for the applied signal and the feedback signal. The output from tachometer 27 driven by motor 17 is shown coupled to the non-inverting input of differential amplifier A1. The tachometer output is referenced to common C as shown. It may be seen that when the movable contact on variable resistor R3 is positioned at the common point and servo motor 17 is still, there is no differential input to amplifier A1 and the amplifier output level will be at zero. Parallel feedback paths are shown around differential amplifier A1 consisting of resistor R7 in one path and the series combination of resistor R8 and capacitor C2 in the other path.

The path in the circuit of FIG. 3 through which a clockwise ($+V$) input command signal from the movable contact on variable resistor R3 is processed from the output of amplifier A1 includes amplifier A2, resistor R12 and transistors Q1, Q3 and Q5. The power side of the circuit for clockwise torque from motor 17 is actuated by transistor Q5 through transistors Q14 and Q12. The ground side of the circuit for clockwise torque is actuated by transistor Q5 through transistors Q8 and Q10. A counterclockwise input command signal is processed from the output of amplifier A1 through amplifier A3, resistor R40 and transistors Q2, Q4 and Q6. Transistor Q6 actuates the power side of the circuit for counterclockwise motor torque through transistors Q7 and Q11 and actuates the ground side of the circuit through transistors Q15 and Q13. The power to motor 17 is pulse width modulated by a one shot device 29. A positive signal level at pin 11 (from either A2 or A3) provides a positive pulse train output at pin 9 at the fixed frequency of an oscillator 31. The width of the pulses in the output pulse train is a direct function of the positive level at the input pin 11 from either amplifier A2 or A3. In this fashion the DC current to motor 17 is pulse width modulated as either transistor Q5 (CW) or Q6 (CCW) is switched on and off by the positive pulses from one shot device 29.

The output of the differential amplifier A1 is coupled through resistor R9 to the inverting input of amplifier A2 and directly to the non-inverting input of amplifier A3 which form a portion of the amplification and external torque compensation network 24. A predetermined output level from amplifier A1, for example 3 volts, will saturate the amplifiers A2 and A3 which results in maximum output torque from servo motor 17 as will hereinafter be described. The outputs of amplifiers A2 and A3 will necessarily be of opposite polarity for a given common input. When the output of either A2 or A3 is at a positive level a positive voltage will appear at pin 11 of the one-shot device indicated at 29. The diodes D1 and D2 maintain the positive signal level from either A2 or A3 at pin 11 of the one-shot. The positive output from A2 or A3 will also turn on respective transistors Q1 or Q2. In the event transistor Q1 is turned on, transistor Q3 is therefore seen to be turned off. With transistor Q3 turned off transistor Q5 is enabled and may thereafter be turned on intermittently by positive pulses at the output pin 9 of one-shot device 29. The one-shot device functions so that the more positive the input signal at pin 11 the more the positive pulse width of the one-shot output at pin 9 is extended.

When transistor Q5 is turned on to initiate clockwise motion of the motor 17, the PNP devices Q8 and Q14 are also turned on. With Q14 turned on, the positive voltage, Vm, is applied to the base of Q12 and is therefore seen to be applied to one terminal of the DC servo motor 17 through the transistor Q12. The opposite terminal voltage on servo motor 17 is connected to the base of transistor Q10, switching current therethrough and thereby providing a DC current path through Q10 and resistor R32 to ground for the armature current through the servo motor 17.

It may be seen that if differential amplifier A1 produces a positive output (counterclockwise rotation desired) then the output of amplifier A3 is positive while the output from amplifier A2 is negative. As a result, a positive signal is available at the input pin 11 of the one-shot device 29 to control the width of the output pulse at one-shot output pin 9. Transistor Q2 is turned on, transistor Q1 held off, and transistor Q4 turned off, thereby enabling transistor Q6 to conduct the modulated output pulses from one-shot 29. The positive pulses from one-shot pin 9 cause transistor Q6 to conduct which in turn causes the PNP devices Q7 and Q15 to conduct. The positive motor voltage, Vm, is thereby connected to turn on transistor Q11 (through Q7) and to conduct DC current to the armature of servo motor 17 through Q11. Transistor Q13 is also turned on by the voltage level at the opposite terminal of servo motor 17 during such counterclockwise driving of the motor providing a complete circuit to ground for the armature motor current through Q13 and resistor R32.

The free-running oscillator 31 is coupled to the one-shot device 29 to provide a pulse frequency for the output pulses from the one-shot device 29. Thus, the output from one-shot 29 is a series of positive pulses at the oscillator frequency which have pulse widths dependent upon the level of the signal at input pin 11. In this fashion, through the circuitry described hereinbefore, the servo motor 17 is driven by a series of pulses having an amplitude Vm and a pulse width determined by the output from either amplifier A2 or A3. The oscillator 31 and the one-shot device 29 may be obtained in a single package designated SE556 provided by Signetics Corporation, Mountain View, Calif.

A DC-to-DC power supply 32, exemplified by Stevens Arnold Model PS4248, Boston, Mass., has coupled thereto a conventional voltage regulator 33 and is powered by the motor voltage source Vm. Power supply 32 provides the control circuit voltages +V and −V and the common (0 volt) signal level C. Overvoltage protection is provided by the Zener diode Z1 which breaks down when Vm reaches an unacceptably high level. The breakdown of Z1 causes transistor Q16 to turn on, grounding the reset terminal R on the one-shot device 29. Output pulses from pin 9 of the one-shot device are then suppressed as long as the low level input remains at the reset terminal. An over-current protection for the circuitry is provided by a voltage divider which includes resistors R29 and R30. When the current through the divider resistors R29 and R30 becomes so high that the common terminal therebetween is raised to a signal level such that transistor Q9 is turned on, the reset terminal R on one-shot device 29 is also placed at ground level through Q9, and output pulses from pin 9 are suppressed.

As seen in FIG. 3, servo motor 17 is coupled mechanically to the turret 11 to drive the turret about the azimuth axis. Current through the servo motor 17 from Q12 to Q10 will cause an output shaft torque in the clockwise direction, and a current in the opposite direction (from Q11 to Q13) will cause an output shaft torque in the counterclockwise direction.

By way of further describing the azimuth control operation, when the azimuth command device 23 is moved so that the sliding contact on resistor R3 has a positive voltage thereon with respect to common (for clockwise rotation), the differential amplifier A1 will provide a negative output therefrom. The negative output being directed to the positive input terminal of amplifier A3 will provide a negative output from A3. The negative output from A1 being also directed to the inverting input of amplifier A2 will provide a positive output therefrom. As hereinbefore described, the higher the positive level at input pin 11 on one-shot device 29, the greater will be the output pulse widths from pin 9. As also hereinbefore described, a positive output at amplifier A2 turns on transistor Q1 and turns off transistor Q3 which enables transistor Q5 to be turned on by the modulated pulses from pin 9 on one-shot 29. The modulated output at the collector of Q5 modulates the application of current to the motor 17 in accordance with the previous circuit description. The servo motor provides output torque in direct relation to the width of the one-shot pulses. The servo motor drives the turret 11 in azimuth, and the tachometer 27 provides an output therefrom which is coupled to an input on the differential amplifier A1. The output from amplifier A1 therefore defines the error signal ev, which is at the proper level to obtain the rotational velocity of the turret 11 about the azimuth axis in accordance with the level of the input command signal selected from the potentiometer R3. It may be seen that motor current is directed through the servo motor 17 in the opposite direction for counterclockwise rotation by selecting a position for the movable contact on potentiometer R3 which is negative with respect to the common center tap. As stated hereinbefore the elevation control channel circuitry is constructed similarly to the azimuth control channel circuitry just described.

When torque of external origin is exerted on the turret 11 around the azimuth axis, as for example due to recoil from a gun 12 offset from the rotational axis, the velocity signal from tachometer 27 may be seen to be altered as the velocity of the turret 11 is altered by the spurious torque. It should be borne in mind, as previously stated, that a predetermined maximum signal level at the output of differential amplifier A1 corresponding to a maximum slew selection at azimuth command device 23 will cause amplifiers A2 and A3 to saturate, thereby providing maximum output torque in the appropriate direction from servo motor 17. The servo motor currently in use provides maximum output torque of approximately 1,000 ft.-lbs. at the azimuth ring gear 13. However, as previously stated, a typically mounted offcenter 20 millimeter weapon mounted in the turret 11 will impart approximately 6,000 ft.-lbs. of torque at the azimuth ring gear due to the weapon recoil. If the spurious torque due to recoil is either added or subtracted to the torque generated by torque motor 17 due to an input command signal, the resultant may be seen to greatly exceed servo motor maximum output torque. The polar moment of inertia about the azimuth axis in a typical installation has been measured as approximately 543 kg. $m^2$ and the drive train inertia with the single drive gear has been measured at approximately 0.0027 kg. $m^2$. Since the gear ratio for the azimuth drive is 45 to 1, in this example, the reflected drive train inertia about the azimuth axis, which is a function of the product of the drive train inertia and the square of the gear ratio, appears as approximately 5.5 kg. $m^2$ at the turret. It may therefore be seen that the turret polar moment of inertia is approximately two orders of magnitude greater than the reflected drive train polar moment of inertia. This suggests that spurious externally applied torques around the azimuth axis could overdrive or back-drive the servo motor 17 and the tachometer 27 if applied for a sufficiently long time. Spurious torques due to weapon recoil are relatively short lived however, since the weapon is designed to fire at relatively high rates, for example 200 rounds per minute. However, the momentary changes in the velocity of the turret about the azimuth axis when the weapon is being fired may be large due to the relatively small reflected drive train inertia and the high recoil torque levels. Consequently, the velocity output signal from the tachometer 27 may show a relatively large change. Externally applied recoil torques of the magnitude recited herein therefore produce an output from differential amplifier A1 which is greatly in excess of the maximum signal level which saturates amplifiers A2 and A3 so that maximum output torque produced by the servo motor 17 will not be sufficient to cause the system to track.

With reference to the timing diagram of FIG. 4 a further explanation of the transient conditions induced by the application of external torques will now be undertaken. When the spurious torque is applied it is assumed that the input command signal is at common (zero reference) and the system is at rest at the time indicated as $t_0$. An external torque such as from an offcenter fired weapon in the turret, is applied about the azimuth axis which causes tachometer 27 to produce a velocity signal. This velocity signal is large because the external torque applied is large in comparison to the maximum torque which may be supplied by the servomotor. The high external torque momentarily drives the servomotor and tachometer 27 to produce a high angular velocity output level because of the low reflected inertia of the azimuth drive train. Therefore, the signals at the differential inputs to amplifier A1 are such that the error signal ev output from A1, seen at 34 in FIG. 4, almost immediately exceeds the level V1 at which amplifiers A2 and A3 are saturated. The torque motor thus produces maximum torque, as seen at 36 (FIG. 4), to arrest the velocity induced by the spurious torque. This begins to cause the error velocity, shown at 37, which has initially jumped to a high level, to begin to decrease. The large transient difference signal at the input to amplifier A1 is integrated by the feedback circuit arrangement of A1 and capacitor C2 so that the output 34 (FIG. 4) continues to increase toward $+V$. Since motor torque 36 has attained its maximum at about $+V1$ output from A1, the system is not tracking. However, maximum torque of the same sense is sustained by the integrated ev (34 in FIG. 4) at the output of A1 causing the turret velocity due to the spurious torque to be zeroed at time t1 and reversed. It will be noted though that the error signal ev (output of A1) is still well above V1 at this time t1 due to the storage capacity of the integrating feedback capacitor C2 even though the signals from input resistor R3 and tachometer 27 are both zero. At time t2 A1 output falls below $+V1$ and the torque from motor 17 falls below maximum. At time t3 the integrated output from A1 stored on capacitor C2 falls to zero level, and the reverse velocity signal from tachometer 27 causes A1 output to reverse polarity to provide torque from servo motor 17 in an opposite sense. Thus, at time t3 the velocity of the turret is seen to decrease, under the influence of the reversed torque, so that it will begin to return toward zero angular rate. At t4 the turret is repositioned substantially to the same angular position it occupied at $t_0$. This may be seen by the equivalency in the areas under the velocity curve 37 from $t_0$ to t1 and from t1 to t4. In this example $t4-t_0$ is about 150 milliseconds. This may be seen to conform to the 200 round per minute firing rate mentioned heretofore, wherein approximately 300 milliseconds elapse between rounds fired. The turret is repositioned by the shot return feature described after a round is fired and well before the next round is fired.

By way of further example, if a motion for turret 11 is selected at the azimuth command device 23, the system will be tracking and the output from amplifier A1 will be relatively small and nearly steady state so that amplifier A1 will be acting as an operational amplifier with a gain in the ratio of R7 to R4+R5. When the azimuth command corresponds to a positive signal with respect to common at the sliding contact on resistor R3 (i.e., clockwise rotation), an externally applied clockwise torque would produce a larger signal of the same sense from the tachometer 27. This would clearly reverse the polarity of the output at differential amplifier A1 (error signal ev), store the integral of the reversed polarity signal over the time the external torque was applied, and as heretofore described cause the servo motor 17 to reposition the turret 11 a corresponding angular displacement behind that position to which it was urged by the external torque. In the same fashion, an external torque which was applied in the counterclockwise sense would clearly provide an output from differential amplifier A1 which would be in the same sense as that provided by the input command from R3 generating the slewing in azimuth. Amplifiers A2 and A3 would be saturated, one of them commanding maximum output torque from the servo motor 17, and the integral of the output from amplifier A1 over the period of time during which the external torque was applied would subsequently be processed by the circuit of FIG. 3 to urge the servo motor to slew in the direction of motion to remove the position effect of the external torque and to resume the angular position in accordance with the input command signal from the azimuth command device 23.

In the embodiment described herein, the polar moment of inertia of the weapon 12 about the devation axis for the weapon is approximately 68 kg. m$^2$. The drive train inertia for the elevation axis is substantially the same as that for the azimuth axis, being approximately 0.0027 kg. m$^2$. The drive gear ratio between the elevation drive gear 19 and the arc gear 18 is 25 to 1 for this example. Therefore, the reflected drive train inertia on the elevation axis, (being the product of the drive train inertia and the square of the gear ratio, is approximately 1.7 kg. m$^2$. The ratio of the elevation rotatable member polar moment of inertia to the reflected elevation drive train inertia is therefore approximately 40 to 1. As described hereinbefore, the ratio of azimuth to azimuth drive train inertia has been found to be approximately 100 to 1. Thus, while the inertia of the rotatable member about the azimuth axis is about two orders of magnitude greater than the reflected azimuth drive train inertia, the inertia of the rotatable member about the elevation axis is more than one order of magnitude greater than the reflected elevation drive train inertia.

Although the best mode contemplated for carrying out the present invention has been herein shown and described, it will be apparent that modification and variation may be made without departing from what is regarded to be the subject matter of the invention.

What is claimed is:

1. A system for controlling the position of a gun turret movable about an azimuth axis, wherein a rapid fire gun having a rapid fire period is mounted in the turret displaced laterally from the azimuth axis, comprising
    an azimuth drive motor,
    a single azimuth gear driven by said azimuth drive motor,
    a ring gear meshed with said single azimuth gear and disposed so that when said drive motor is energized the turret rotates about the azimuth axis, the reflected moment of inertia of said drive motor and single azimuth gear being at least two orders of magnitude less than the turret moment of inertia about the azimuth axis,
    an angular velocity sensor mounted to provide a signal indicative of the rate of turn of the turret about the azimuth axis,
    a command control accessible to an operator for providing an azimuth input velocity command signal,
    single means for comparing and for integrating the difference between said input command signal and said rate of turn signal and for providing an error signal responsive to said integration,
    and means for coupling said error signal to said azimuth drive motor so that angular position error due to torque input about the azimuth axis caused by firing of the laterally displaced gun in the turret is corrected within the rapid fire period.

2. A system as in claim 1 wherein said means for coupling said error signal to said drive motor includes a pulse width modulator, and means for utilizing the modulated pulses to control the power supplied to said drive motor in accordance with the relative polarity of the motor drive signal so that the turret is driven in a rotational direction corresponding thereto.

3. A system as in claim 1 wherein the rapid fire gun is movable in the turret about an elevation axis and wherein the gun assembly is mounted in the turret vertically displaced from the elevation axis, together with
    an elevation drive motor,
    a single elevation gear driven by said elevation drive motor,
    a sector gear meshed with said single elevation gear and disposed so that when said elevation drive motor is energized the gun is driven rotationally about the elevation axis, the reflected moment of inertia of said elevation drive motor and single elevation gear being at least one order of magnitude less than the gun assembly moment of inertia about the elevation axis,
    an angular velocity sensor mounted to provide a signal indicative of the rate of turn of the gun about the elevation axis,
    a command control accessible to the operator for providing an elevation input velocity command signal,
    single means for comparing and for integrating the difference between said input command signal and said elevation rate of turn signal and for providing an error signal responsive to said elevation integration,
    and means for coupling said elevation error signal to said elevation drive motor so that elevation angular position error due to torque input about the elevation axis caused by firing of the vertically displaced gun in the turret is corrected within the rapid fire period.

4. A system as in claims 1 or 3 wherein the rapid fire period is approximately 300 milliseconds.

* * * * *